United States Patent
Hsu et al.

(10) Patent No.: US 10,281,808 B2
(45) Date of Patent: May 7, 2019

(54) MULTILAYER WAVELENGTH CONVERSION DEVICE AND PROJECTOR

(71) Applicant: Coretronic Corporation, Hsin-Chu (TW)

(72) Inventors: Pi-Tsung Hsu, Hsin-Chu (TW); Chia-Lun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/156,338

(22) Filed: May 17, 2016

(65) Prior Publication Data

US 2017/0059979 A1    Mar. 2, 2017

(30) Foreign Application Priority Data

Aug. 31, 2015   (TW) .............................. 104128577 A (51) Int. Cl.
   *G03B 21/20* (2006.01)
   *G02B 26/00* (2006.01)
   (Continued)

(52) U.S. Cl.
   CPC ......... *G03B 21/204* (2013.01); *G02B 26/008* (2013.01); *G03B 33/08* (2013.01); *G03B 21/2066* (2013.01); *H04N 9/3114* (2013.01)

(58) Field of Classification Search
   CPC ... G03B 21/204; G02B 26/008; H04N 9/3114
   See application file for complete search history.

(56) References Cited

U.S. PATENT DOCUMENTS

| 8,556,437 B2 | 10/2013 | Miyake |
| 8,919,976 B2 * | 12/2014 | Nagasaki .................. F21V 9/00 257/98 |

(Continued)

FOREIGN PATENT DOCUMENTS

| CN | 102081210 | 1/2013 |
| CN | 103715344 | 4/2014 |

(Continued)

OTHER PUBLICATIONS

"Office Action of Taiwan Counterpart Application", dated Aug. 9, 2016, p. 1-p. 7.

(Continued)

*Primary Examiner* — Bao-Luan Q Le
(74) *Attorney, Agent, or Firm* — JCIPRNET (57) ABSTRACT

A wavelength conversion device adapted to convert a wavelength of an exciting light beam is provided. The wavelength conversion device includes a main body, a middle connection layer and a wavelength conversion adhesive layer. The main body has a reflective surface, wherein the reflective surface has a first region and a second region, and the second region is located at a transmission path of the exciting light beam. The middle connection layer is disposed on the first region and exposes the second region. The wavelength conversion adhesive layer is adhered on the middle connection layer and covers the second region, wherein the exciting light beam is adapted to pass the wavelength conversion layer to be reflected by the second region. In addition, a projector having a wavelength conversion device is also provided.

24 Claims, 6 Drawing Sheets

(51) Int. Cl.
*G03B 33/08* (2006.01)
*H04N 9/31* (2006.01)

(56) References Cited

U.S. PATENT DOCUMENTS

| | | | | |
|---|---|---|---|---|
| 8,979,276 | B2* | 3/2015 | Miyazaki | F16F 15/324 353/84 |
| 9,075,293 | B2* | 7/2015 | Zhang | F21V 9/00 |
| 9,291,313 | B2* | 3/2016 | Kashiwagi | F21K 9/56 |
| 9,341,933 | B2* | 5/2016 | Jao | G03B 21/2093 |
| 9,432,640 | B2* | 8/2016 | Chang | H04N 9/00 |
| 9,503,700 | B2* | 11/2016 | Dai | H04N 9/3158 |
| 9,519,207 | B2* | 12/2016 | Nakatsu | G03B 21/204 |
| 9,581,879 | B2* | 2/2017 | Hsieh | G02F 1/353 |
| 2012/0201030 | A1* | 8/2012 | Yuan | G02B 26/008 362/293 |
| 2012/0314411 | A1* | 12/2012 | Nagasaki | F21V 9/00 362/231 |
| 2013/0027671 | A1* | 1/2013 | Miyazaki | F16F 15/324 353/31 |
| 2013/0163225 | A1* | 6/2013 | Nakatsu | G03B 21/204 362/84 |
| 2013/0194551 | A1* | 8/2013 | Zhang | F21V 9/00 353/31 |
| 2013/0201458 | A1* | 8/2013 | Kashiwagi | F21K 9/56 353/85 |
| 2014/0043829 | A1* | 2/2014 | Wu | F21V 13/08 362/324 |
| 2015/0098065 | A1* | 4/2015 | Tanaka | G03B 21/2013 353/84 |
| 2015/0098070 | A1* | 4/2015 | Hsieh | G02F 1/353 355/67 |
| 2015/0116982 | A1* | 4/2015 | Jao | G03B 21/2093 362/84 |
| 2015/0185596 | A1* | 7/2015 | Hsieh | G03B 21/204 353/84 |
| 2015/0226389 | A1* | 8/2015 | Kasugai | G02B 26/008 353/31 |
| 2015/0229892 | A1* | 8/2015 | Dai | H04N 9/3158 353/31 |
| 2015/0316839 | A1* | 11/2015 | Jeoung | G03B 21/204 353/20 |
| 2015/0354787 | A1* | 12/2015 | Chang | H04N 9/00 362/84 |
| 2016/0004138 | A1* | 1/2016 | Jao | G02F 1/3532 353/31 |
| 2016/0004147 | A1* | 1/2016 | Hu | H04N 9/315 362/84 |
| 2016/0077415 | A1* | 3/2016 | Motoya | G03B 21/204 353/84 |
| 2016/0238922 | A1* | 8/2016 | Furuyama | G02B 26/008 |
| 2016/0252722 | A1* | 9/2016 | Li | F21V 9/16 362/84 |
| 2016/0266375 | A1* | 9/2016 | Li | H05B 33/10 |
| 2016/0274353 | A1* | 9/2016 | Ando | C09K 11/02 |
| 2016/0377967 | A1* | 12/2016 | Ando | G02B 26/008 362/84 |

FOREIGN PATENT DOCUMENTS

| | | |
|---|---|---|
| JP | 2006220948 | 8/2006 |
| JP | 2010256457 | 11/2010 |
| JP | 2012073489 | 4/2012 |
| JP | 2013120713 | 6/2013 |
| TW | 201245844 | 11/2012 |
| TW | I385342 | 2/2013 |
| TW | M448705 | 3/2013 |
| TW | 201319718 | 5/2013 |
| TW | 201523116 | 6/2015 |
| TW | 201525604 | 7/2015 |
| WO | 2014194864 | 12/2014 |

OTHER PUBLICATIONS

"Office Action of China Counterpart Application," dated Dec. 1, 2017, p. 1-p. 9.

* cited by examiner

MULTILAYER WAVELENGTH CONVERSION DEVICE AND PROJECTOR

CROSS-REFERENCE TO RELATED APPLICATION

This application claims the priority benefit of Taiwan application serial no. 104128577, filed on Aug. 31, 2015. The entirety of the above-mentioned patent application is hereby incorporated by reference herein and made a part of this specification.

BACKGROUND OF THE INVENTION

Field of the Invention

The invention is related to an optical device and a projector, and particularly related to a wavelength conversion device and a projector having the wavelength conversion device.

Description of Related Art

Recently, projection apparatus applying a solid state light source such as light-emitting diodes (LEDs) and laser diodes gradually becomes popular in the market. Since a lighting efficiency of the laser diode is about 20% higher than a lighting efficiency of the LED, in order to break through the light source limitation of the LED, a technique of using the laser light source to excite the phosphor powder to generate a pure color light source required by the projector is gradually developed. Moreover, the laser projection apparatus can use the laser beam provided by the laser diode to excite the phosphor powder to emit light as the illumination light source for the projector, so as to meet different brightness requirements of the projector. Therefore, the laser light source device serving as a light source system of the projector has a great potential to replace conventional high pressure mercury lamps to become the light source of the projectors of a new generation.

For current laser projectors, generally a phosphor powder adhesive layer is coated on a metal substrate with high reflectivity to constitute a phosphor wheel, and the laser beam (e.g. blue light) emitted by the laser light source device excites the phosphor powder adhesive layer on the metal substrate of the phosphor wheel so as to generate light beam with different colors (such as green light and yellow light); and the laser beam can directly pass through the phosphor wheel by going through a slot on the metal substrate or via a transparent plate disposed on the metal substrate, in order to generate light with multiple colors. Specifically, if the phosphor powder adhesive layer is directly coated on the metal substrate, the adhesion between the phosphor powder adhesive layer and the metal substrate may not be good due to high concentration of the phosphor powder in the phosphor powder adhesive layer, causing the phosphor powder adhesive layer to fall off the metal substrate of the phosphor wheel easily. On the other hand, if a modifier is used as the adhesive medium for adhering the phosphor powder adhesive layer with the metal substrate to solve the poor adhesion issue, the reflectivity of the metal substrate may be reduced due to the chemical reaction generated between the modifier and the metal substrate, and consequently the optical quality of the laser projector may be lowered as well.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY OF THE INVENTION

The invention provides a wavelength conversion device, and a main body thereof may be firmly combined with a wavelength conversion adhesive layer, ensuring that a reflective surface of the main body has good reflectivity.

The invention provides a projector which has a wavelength conversion device, and the main body of the wavelength conversion device may be firmly combined with the wavelength conversion adhesive layer wavelength conversion adhesive layer, ensuring that the reflective surface of the main body has good reflectivity and the adhesive force between the and the main body of the of the wavelength conversion device is improved.

The objectives and advantages of the invention may be further understood in the technical features disclosed in the invention.

To achieve one or a part or all the objectives or other objectives, an embodiment of the invention provides a wavelength conversion device adapted to convert a wavelength of an exciting light beam. The wavelength conversion device includes a main body, a middle connection layer and a wavelength conversion adhesive layer. The main body has a reflective surface, wherein the reflective surface has a first region and a second region. The second region is located at a transmission path of the exciting light beam. The middle connection layer is disposed on the first region and exposes the second region. The wavelength conversion adhesive layer is adhered on the middle connection layer and covers the second region, wherein the exciting light beam is adapted to pass through the wavelength conversion adhesive layer to be reflected by the second region.

In an embodiment of the invention, the wavelength conversion adhesive layer has a first wavelength conversion region and a second wavelength conversion region. The main body is adapted to rotate so as to drive the first wavelength conversion region and the second wavelength conversion region to move in sequence to the transmission path of the exciting light beam. The first wavelength conversion region covers a portion of the second region, and the second wavelength conversion region covers another portion of the second region. The wavelength conversion adhesive layer is adapted to convert the exciting light beam into a first conversion light beam having a first wavelength by the first wavelength conversion region, and adapted to convert the exciting light beam into a second conversion light beam having a second wavelength by the second wavelength conversion region. The first wavelength is different from the second wavelength.

To achieve one or a part or all the objectives or other objectives, an embodiment of the invention provides a wavelength conversion device adapted to covert the wavelength of an exciting light beam. The wavelength conversion device includes a main body, a middle adhesive layer and a wavelength conversion adhesive layer. The main body has a reflective surface, wherein the reflective surface is located at a transmission path of the exciting light beam. The middle adhesive layer is adhered to the reflective surface, and the material of the middle adhesive layer includes adhesive and phosphor powder. The wavelength conversion adhesive layer is adhered to the middle adhesive layer, wherein the exciting light beam is adapted to pass through the wavelength conversion adhesive layer to be reflected by the reflective surface.

To achieve one or a part or all the objectives or other objectives, an embodiment of the invention provides a projector including an exciting light source device, a wavelength conversion device, a light valve and a projection lens. The exciting light source device is adapted to provide an exciting light beam. The wavelength conversion device is adapted to convert the wavelength of the exciting light beam. The wavelength conversion device includes a main body, a middle connection layer and a wavelength conversion adhesive layer. The main body has a reflective surface, wherein the reflective surface has a first region and a second region. The second region is located at a transmission path of the exciting light beam. The middle connection layer is disposed on the first region and exposes the second region. The wavelength conversion adhesive layer is adhered on the middle connection layer and covers the second region, wherein the exciting light beam is adapted to pass through the wavelength conversion adhesive layer to be reflected by the second region. The light valve is located at the transmission path of the exciting light beam and adapted to convert the exciting light beam into an image light beam. The projection lens is located at the transmission path of the image light beam and adapted to convert the image light beam into a projection light beam.

To achieve one or a part or all the objectives or other objectives, an embodiment of the invention provides a projector including an exciting light source device, a wavelength conversion device, a light valve and a projection lens. The exciting light source device is adapted to provide an exciting light beam. The wavelength conversion device is adapted to convert the wavelength of the exciting light beam. The wavelength conversion device includes a main body, a middle adhesive layer and a wavelength conversion adhesive layer. The main body has a reflective surface, wherein the reflective surface is located at a transmission path of the exciting light beam. The middle adhesive layer is adhered on the reflective surface, and the material of the middle adhesive layer includes adhesive and phosphor powder. The wavelength conversion adhesive layer is adhered on the middle adhesive layer, wherein the exciting light beam is adapted to pass through the wavelength conversion adhesive layer to be reflected by the reflective surface. The light valve is located at the transmission path of the exciting light beam and adapted to convert the exciting light beam into an image light beam. The projection lens is located at the transmission path of the image light beam and adapted to convert the image light beam into a projection light beam.

Based on the above, the embodiments of the invention have at least one of the advantages or effects. In the invention, the middle connection layer serves as the adhesive medium between the wavelength conversion adhesive layer and the main body such that the main body of the wavelength conversion device can be firmly combined with the wavelength conversion adhesive layer; accordingly, the service life of the wavelength conversion device may be prolonged. The second region of the reflective surface of the main body is located at the transmission path of the exciting light beam, and the middle connection layer may be disposed to expose the second region such that the exciting light beam does not pass through the middle connection layer, so as to prevent the middle connection layer from reducing the wavelength conversion efficiency and reflection efficiency of the wavelength conversion device with respect to the exciting light beam. In addition, the middle connection layer may be a middle adhesive layer including adhesive and phosphor powder, thus the concentration of the phosphor powder in the middle adhesive layer may be set to be lower than the concentration of the phosphor powder in the wavelength conversion adhesive layer to enable the adhesive layer to have strong adhesive force, such that the wavelength conversion adhesive layer can be thinly adhered to the main body.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B"

component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
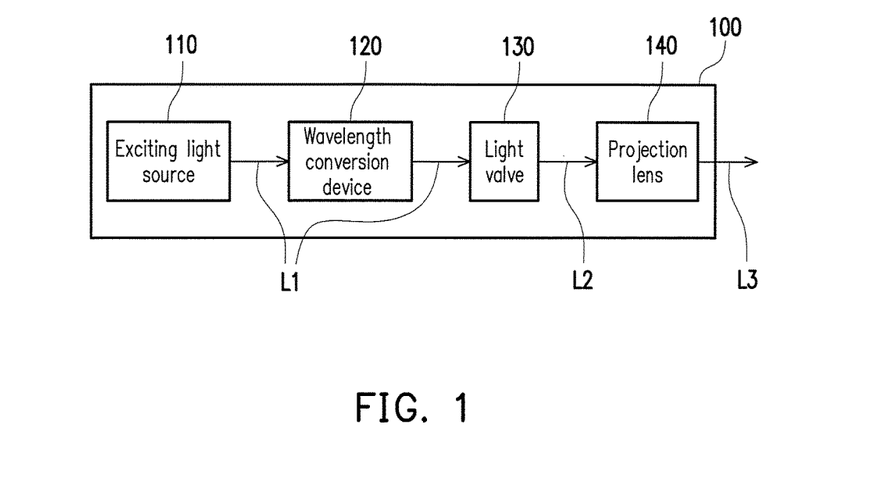
FIG. 1 is a schematic view illustrating a projector according to an embodiment of the invention.

FIG. 1 is a schematic view illustrating a projector according to an embodiment of the invention. Please refer to FIG. 1. A projector 100 in the embodiment includes an exciting light source 110, a wavelength conversion device 120, a light valve 130 and a projection lens 140. The exciting light source 110 is, for example, a laser light source and adapted to provide an exciting light beam L1. The wavelength conversion device 120 is, for example, a phosphor wheel or a plate with phosphor powder, and the wavelength conversion device 120 is located at the transmission path of the exciting light beam L1 and adapted to convert a wavelength of exciting light beam L1 so as to generate a conversion light beam having different wavelength. The light valve 130 is located at the transmission path of the exciting light beam L1 and the conversion light beam and adapted to convert the exciting light beam L1 and the conversion light beam into an image light beam L2. The projection lens 140 is located at the transmission path of the image light beam L2, and the image light beam L2 is adapted to be projected by the projection lens 140 to form a projection light beam L3.

Figure 2:
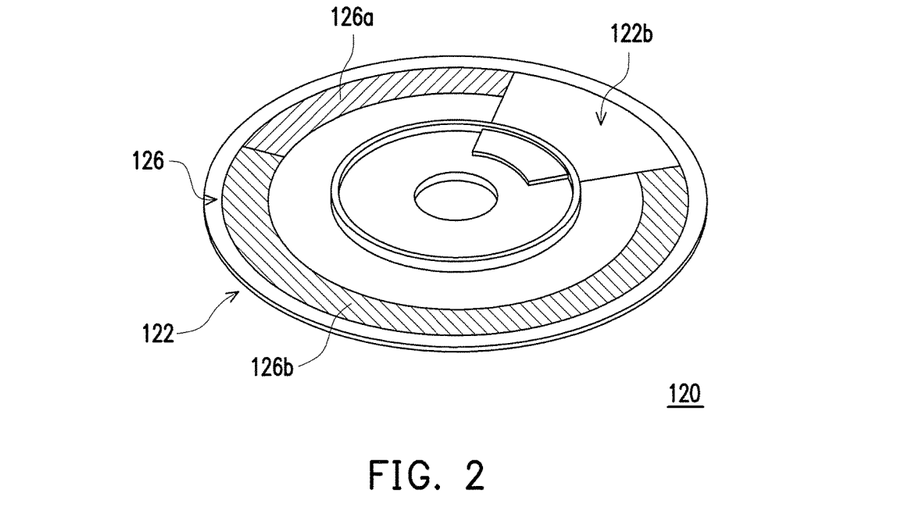
FIG. 2 is a perspective view illustrating a wavelength conversion device shown by FIG. 1.
Figure 3:
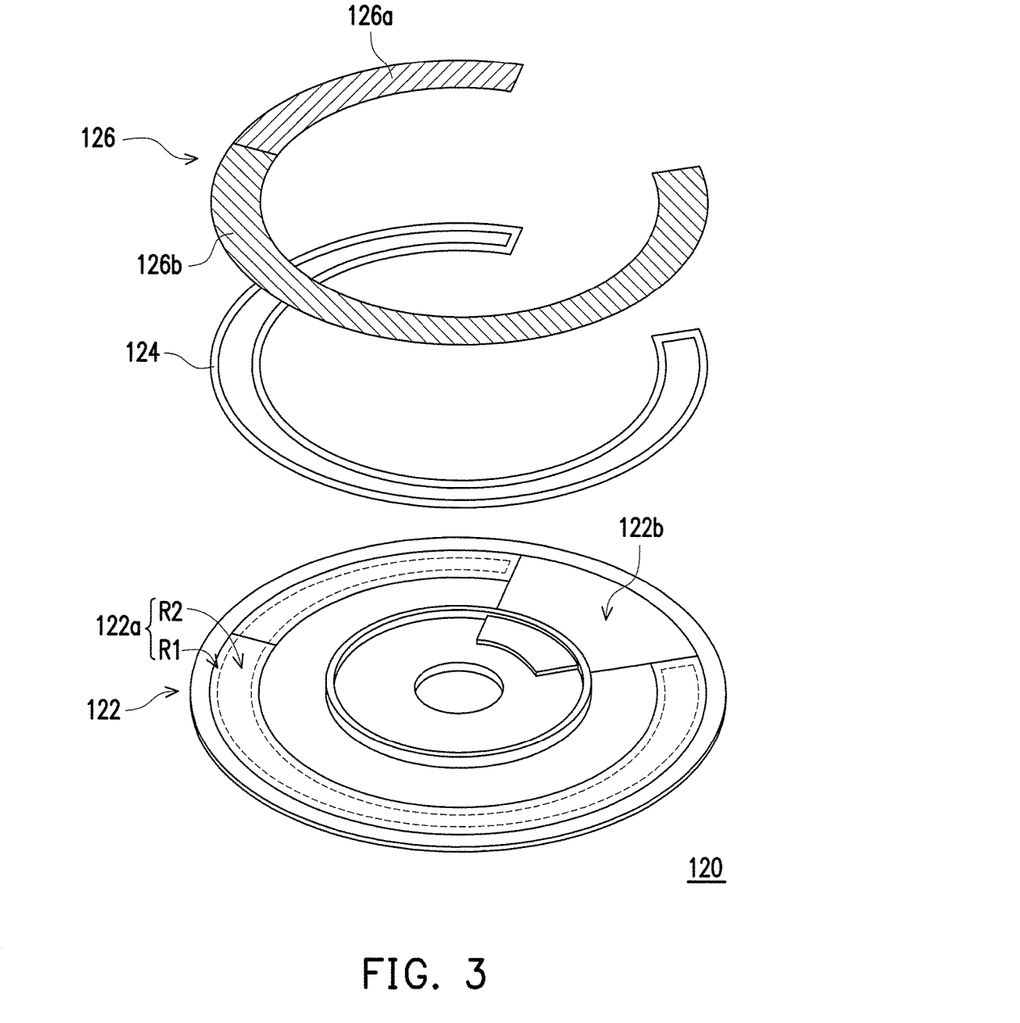
FIG. 3 is an explosive view illustrating the wavelength conversion device shown by FIG. 2.

FIG. 2 is a perspective view illustrating the wavelength conversion device shown by FIG. 1. FIG. 3 is an explosive view illustrating the wavelength conversion device shown by FIG. 2. Please refer to FIGS. 2-3. In the embodiment, a wavelength conversion device 120 includes a main body 122, a middle connection layer 124 and a wavelength conversion adhesive layer 126. The main body 122 has a reflective surface 122a and a light transmission region 122b. The wavelength conversion device 120 is, for example, a phosphor wheel adapted to rotate about a central axis, and the reflective surface 122a and the light transmission region 122b move in sequence to the transmission path of the exciting light beam L1 shown by FIG. 1. The reflective surface 122a of the wavelength conversion device 120 has a first region R1 and a second region R2. The first region R1 surrounds the second region R2, and the second region R2 is located at the transmission path of the exciting light beam L1 shown by FIG. 1. In the embodiment, the first region R1 and the second region R2 are disposed in the reflective surface 122a in an annular manner, and the edge of the first region R1 (e.g. the region between the solid-line frame and the dotted-line frame shown by FIG. 3) and the edge of the second region R2 (e.g. the region in the dotted-line frame shown by FIG. 3) are disposed adjacent to each other. The middle connection layer 124 is attached on the reflective surface 122a, and the middle connection layer 124 is disposed on the first region R1 and exposes the second region R2. The edge of the wavelength conversion adhesive layer 126 is adhered to the middle connection layer 124. The middle connection layer 124 is located between the wavelength conversion adhesive layer 126 and the first surface R1 of the reflective surface 122a, and the wavelength conversion adhesive layer 126 covers and is adhered on the second region R2, wherein the material of the wavelength conversion adhesive layer 126 includes adhesive and phosphor powder to form a phosphor adhesive layer. The exciting light beam L1 shown by FIG. 1 is adapted to pass through the wavelength conversion adhesive layer 126 to be reflected by the second region R2 of the reflective surface 122a.

With the above configuration, the middle connection layer 124 serves as an adhesive medium between the wavelength conversion adhesive layer 126 and the main body 122 so that the main body 122 of the wavelength conversion device 120 can be firmly combined with the wavelength conversion adhesive layer 126; accordingly, the service life of the wavelength conversion device 120 may be prolonged. The second region R2 of the reflective surface 122a of the main body 122 is located at the transmission path of the exciting light beam L1 shown by FIG. 1, and a width of the second region R2 in a radial direction is equal to or larger than a diameter of a light spot of the exciting light beam L1. The middle connection layer 124 is disposed to expose the second region R2 so that the exciting light beam L1 does not pass through the middle connection layer 124 in the first region R1, such that it is possible to prevent the middle connection layer 124 from reducing the wavelength conversion efficiency and reflection efficiency of the wavelength conversion device 120 with respect to the exciting light beam L1.

In the embodiment, the middle connection layer 124 is, for example, a middle adhesive layer containing adhesive and phosphor powder, and the concentration of the phosphor powder in the middle adhesive layer is set to be lower than the concentration of the phosphor powder in the wavelength conversion adhesive layer 126 so the middle adhesive layer has a strong adhesive force. Accordingly, the wavelength conversion adhesive layer 126 can be firmly adhered on the main body 122 of the wavelength conversion device 120. With such configuration, the wavelength conversion adhesive layer 126 does not fall off easily when the wavelength conversion device 120 operates. For example, the concentration of the phosphor powder in the middle connection layer 124 is, for example, 20% to 60%, and the concentration of the phosphor powder in the wavelength conversion adhesive layer 126 is, for example, 60% to 90%. The middle connection layer 124 may be pure adhesive without the phosphor powder so as to provide high adhesive force, and enable the wavelength conversion adhesive layer 126 to be more firmly adhered on the main body 122 of the wavelength conversion device 120. In the embodiment, the thickness of the adhesive layer (i.e. the middle connection layer 124) is, for example, 0.01 to 0.05 mm. The adhesive may contain silica gel, ceramic gel, or other suitable types of adhesive, and the invention provides no limitation thereto.

In the embodiment, a light transmission region 122b of the main body 122 of the wavelength conversion device 120 is adjacent to the reflective surface 122a and, for example, formed of glass having an antireflection coating. The wavelength conversion adhesive layer 126 has a first wavelength conversion region 126a and a second wavelength conversion region 126b. The first wavelength conversion region 126a and the second wavelength conversion region 126b have different phosphor powder which may be excited by the exciting light beam L1 (shown in FIG. 1) to emit conversion light beams having different colors and wavelengths. The first wavelength conversion region 126a covers a portion of the second region R2 of the reflective surface 122a, and the portion of the second region R2 corresponding to the first wavelength conversion region 126a is adhered on the middle connection layer 124 in the first region R1. The second wavelength conversion region 126b covers another portion of the second region R2 of the reflective surface 122a, and the second wavelength conversion region 126b corresponding to said another portion of the second region R2 is adhered on the middle connection layer 124 in the first region R1.

The main body 122, for example, has a disc-shaped metal substrate having high reflection coating and adapted to be driven to rotate about the central axis so as to drive the light transmission region 122b, the first wavelength conversion region 126a and the second wavelength conversion region 126b to move in sequence to the transmission path of the exciting light beam L1 shown by FIG. 1. The first wavelength conversion region 126a of the wavelength conversion adhesive layer 126 is adapted to convert the exciting light beam L1 (e.g. blue light) into a first conversion light beam (e.g. green light) having a first wavelength, and the second wavelength conversion region 126b of the wavelength conversion adhesive layer 126 is adapted to convert the exciting light beam L1 into a second conversion light beam (e.g. yellow light) having a second wavelength, and the invention provides no limitation to the color of the light beam. The first wavelength is different from the second wavelength, and the first wavelength and the second wavelength are different from the wavelength of the exciting light beam L1. The exciting light beam L1 may directly pass through the main body 122 via the light transmission region 122b on the main body 122. Accordingly, the exciting light beam L1 may generate conversion light beams having various colors after passing through the wavelength conversion device 120.

Figure 4:
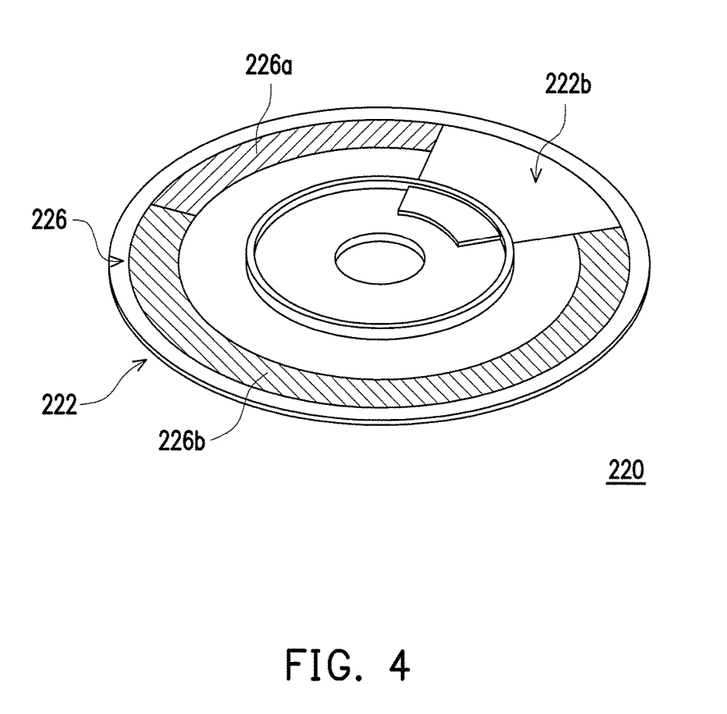
FIG. 4 is a perspective view illustrating a wavelength conversion device according to another embodiment of the invention.
Figure 5:
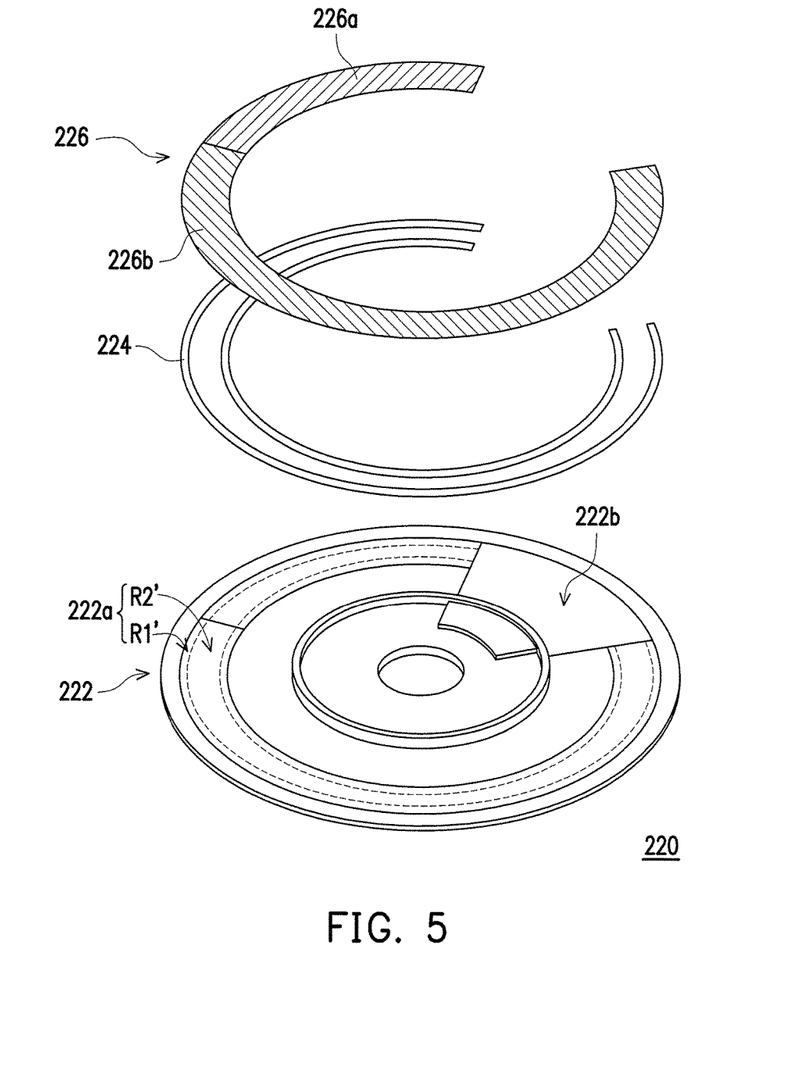
FIG. 5 is an explosive view illustrating the wavelength conversion device shown by FIG. 4.

FIG. 4 is a perspective view illustrating a wavelength conversion device according to another embodiment of the invention. FIG. 5 is an explosive view illustrating the wavelength conversion device shown by FIG. 4. In a wavelength conversion device 220 shown by FIG. 4 and FIG. 5, a main body 222, reflective surface 222a, first region R1' (e.g. the region between the solid-line frame and the dotted-line frame shown by FIG. 5), second region R2' (e.g. the region in the dotted-line frame shown by FIG. 5), light transmission region 222b, middle connection layer 224, wavelength conversion adhesive layer 226, first wavelength conversion region 226a, and second wavelength conversion region 226b are configured and operate in a similar way as the main body 122, the reflective surface 122a, the first region R1, the second region R2, the light transmission region 122b, the middle connection layer 124, the wavelength conversion adhesive layer 126, the first wavelength conversion region 126a, and the second wavelength conversion region 126b shown by FIG. 2 and FIG. 3. Accordingly, similar descriptions are not repeated herein.

The difference between the wavelength conversion device 220 and the wavelength conversion device 120 lies in that the middle connection layer 224 is a modifier instead of an adhesive layer 124. A chemical reaction is generated between the modifier and the first region R1' of the reflective surface 222a of the main body 222, such that the reflective surface 222a corresponding to the first region R1' changes in property, which enables the modifier to be combined with the first region R1' of the reflective surface 222a. Besides, the modifier is a better adhesive interface with respect to the wavelength conversion adhesive layer 226; therefore, the wavelength conversion adhesive layer 226 may be firmly combined with the reflective surface 222a in the presence of the modifier. Moreover, the wavelength conversion adhesive layer 226 covers and is adhered on the second region R2'. The second region R2' of the reflective surface 222a of the main body 222 is located at the transmission path of the exciting light beam L1 shown by FIG. 1, and the modifier is disposed to expose the second region R2' such that the exciting light beam L1 passes through the wavelength conversion adhesive layer 226 corresponding to the second region R2' and does not pass through the modifier in the first region R1'. Since the modifier is not combined with the reflective surface 222a corresponding to the second region R2', the reduction of the reflectivity of the second region R2' which is caused by a chemical reaction generated between the modifier and the second region R2' is possibly prevented. In the embodiment, the thickness of the modifier is, for example, 0.001 to 0.01 mm, the material of the modifier includes organic silicon or other suitable materials for modification, and the invention provides no limitation thereto.

Figure 6:
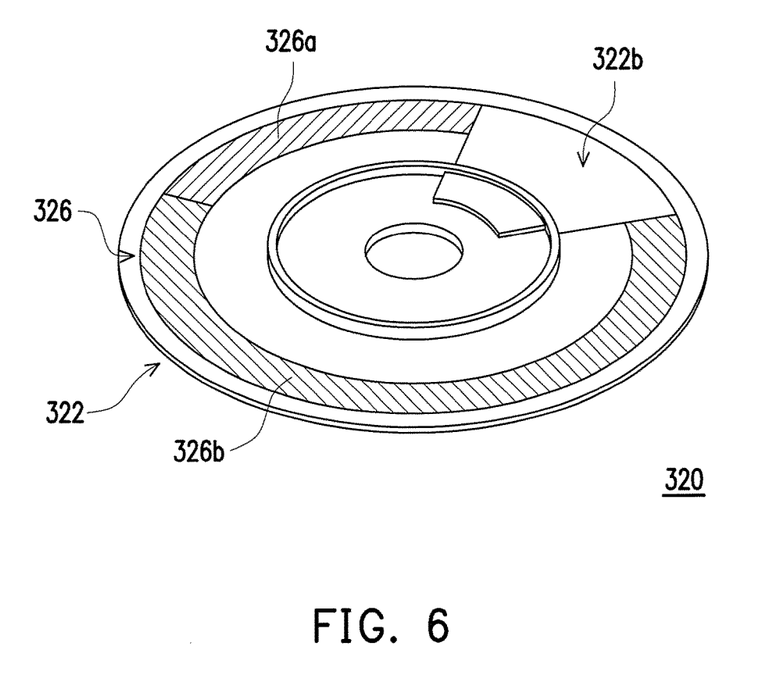
FIG. 6 is a perspective view illustrating a wavelength conversion device according to another embodiment of the invention.
Figure 7:
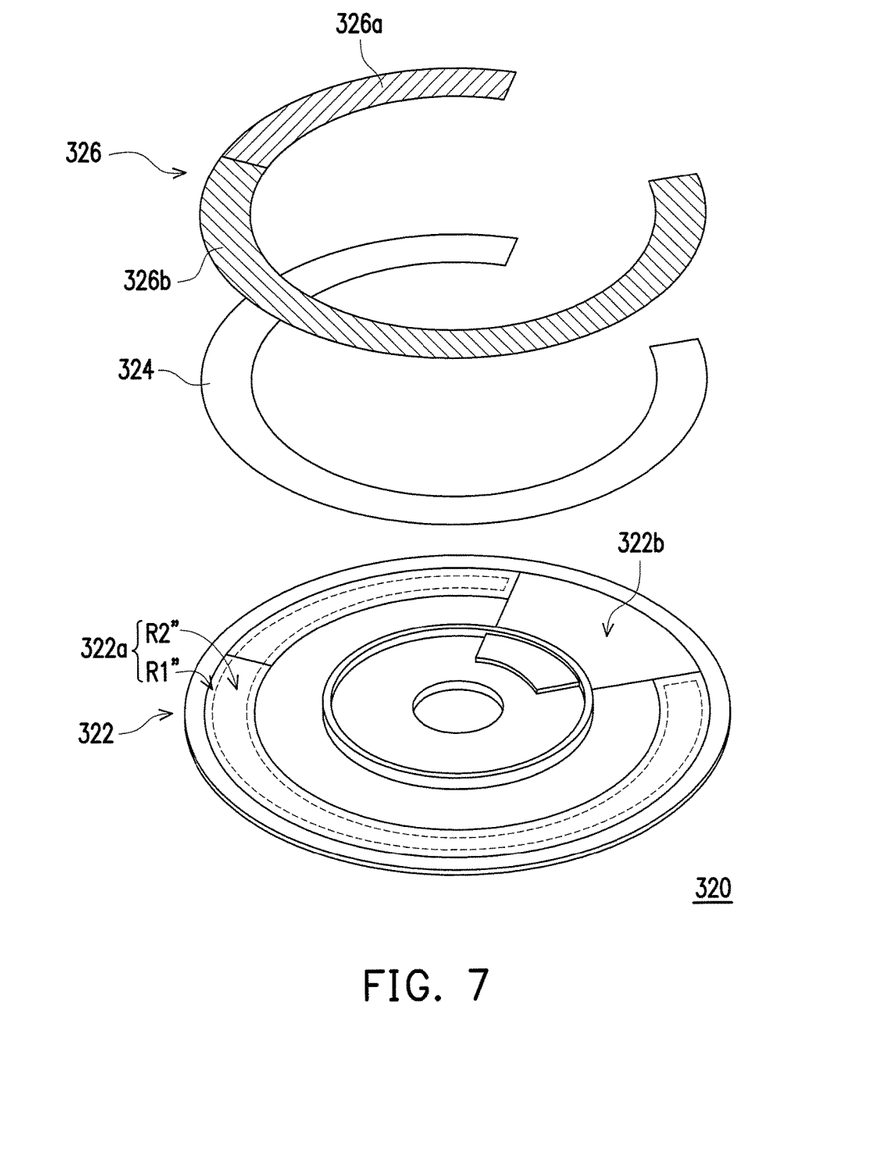
FIG. 7 is an explosive view illustrating the wavelength conversion device shown by FIG. 6.

FIG. 6 is a perspective view illustrating a wavelength conversion device according to another embodiment of the invention. FIG. 7 is an explosive view illustrating the wavelength conversion device shown by FIG. 6. In a wavelength conversion device 320 shown by FIG. 6 and FIG. 7, a main body 322, reflective surface 322a, first region R1" (e.g. a region between the solid-line frame and dotted-line frame shown by FIG. 7), second region R2" (e.g. a region in the dotted-line frame shown by FIG. 7), light transmission region 322b, middle connection layer 324, wavelength conversion adhesive layer 326, first wavelength conversion region 326a, and second wavelength conversion region 326b are configured and operate in a similar way as the main body 122, reflective surface 122a, first region R1, second region R2, light transmission region 122b, middle connection layer 124, wavelength conversion adhesive layer 126, first wavelength conversion region 126a, second wavelength conversion region 126b shown by FIG. 2 and FIG. 3. Accordingly, similar descriptions are not repeated herein.

The difference between the wavelength conversion device 320 and the wavelength conversion device 120 lies in that the middle connection layer 324 is not only adhered on the first region R1" of the reflective surface 322a but also adhered on the second region R2" of the reflective surface 322a, such that the middle connection layer 324 is more firmly adhered between the wavelength conversion adhesive layer 326 and the reflective surface 322a of the main body 322. In the embodiment, under the condition where the middle connection layer 324 is a middle adhesive layer containing phosphor powder and adhesive, the type of the phosphor powder contained in the portion of the middle adhesive layer (the middle connection layer 324) is the same as the type of the phosphor powder contained in the first wavelength conversion region 326a corresponding to the portion the middle adhesive layer. Meanwhile, the type of phosphor powder contained in another portion of the middle adhesive layer (the middle connection layer 324) is the same as the type of the phosphor powder included in the second wavelength conversion region 326b corresponding to the another portion of the middle adhesive layer. The middle connection layer 324 may be pure adhesive without the phosphor powder, and the invention provides no limitation thereto.

In summary, the embodiments of the invention at least have one of the following advantages or effects. In the invention, the middle connection layer serves as an adhesive medium between the wavelength conversion adhesive layer and the main body, such that the main body of the wavelength conversion device can be firmly combined with the wavelength conversion adhesive layer so the service life of the wavelength conversion device may be prolonged. In the meantime, the second region of the reflective surface of the main body is located at the transmission path of the exciting path, and the middle connection layer may be configured to connect to the first region and expose the second region so that the exciting light beam does not pass through the middle connection layer. Accordingly, it is possible to prevent the middle connection layer from reducing the wavelength conversion efficiency and the reflection efficiency of the wavelength conversion device with respect to the exciting light beam. Specifically, the middle connection layer may be a modifier, and the modifier is a better adhesive interface with respect to the wavelength conversion adhesive layer. Besides, the chemical reaction generated between the modifier and the reflective surface enables the modifier to be combined with the reflective surface, such that the wavelength conversion adhesive layer may be firmly combined with the reflective surface via the modifier. Based on the above, under the condition where the modifier is set not to be combined with the second region of the reflective surface, the reduction of the reflectivity of the second region which is caused by the chemical reaction generated between the modifier and the second region is possibly prevented. In addition, the middle connection layer may be a middle adhesive layer that contains adhesive and phosphor powder. The concentration of the phosphor powder in the middle adhesive layer is set to be lower than the concentration of the phosphor powder in the wavelength conversion adhesive layer such that the middle adhesive layer has better adhesive force, which enables the wavelength conversion adhesive layer to be firmly adhered on the main body of the wavelength conversion device.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all tennis are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device adapted to convert a wavelength of an exciting light beam, the wavelength conversion device comprising:
   a main body having a reflective surface, wherein the reflective surface has a first region and a second region, the second region is located at a transmission path of the exciting light beam and the first region is not located at the transmission path of the exciting light beam;
   a middle connection layer disposed on the first region and exposing the second region; and
   a wavelength conversion adhesive layer adhered on the middle connection layer, wherein the wavelength conversion adhesive layer covers and adheres without a spatial air gap to the second region, wherein the exciting light beam is adapted to pass through the wavelength conversion adhesive layer to be reflected by the second region, wherein the middle connection layer is disposed between the first region and the wavelength conversion adhesive layer.

2. The wavelength conversion device according to claim 1, wherein the middle connection layer is a modifier.

3. The wavelength conversion device according to claim 1, wherein the middle connection layer is an adhesive layer.

4. The wavelength conversion device according to claim 2, wherein a material of the modifier comprises organic silicon.

5. The wavelength conversion device according to claim 2, wherein a chemical reaction is generated between the modifier and the first region of the reflective surface such that the modifier is combined with the first region of the reflective surface.

6. The wavelength conversion device according to claim 1, wherein the first region at least partially surrounds the second region.

7. The wavelength conversion device according to claim 1, wherein at least a portion of an edge of the wavelength conversion adhesive layer is adhered on the middle connection layer.

8. The wavelength conversion device according to claim 1, wherein the wavelength conversion adhesive layer has a first wavelength conversion region and a second wavelength conversion region, and the main body is adapted to rotate so as to drive the first wavelength conversion region and the second wavelength conversion region to move in sequence to the transmission path of the exciting light beam, the first wavelength conversion region covers a portion of the second region, the second wavelength conversion region covers another portion of the second region, the wavelength conversion adhesive layer is adapted to convert the exciting light beam into a first conversion light beam having a first wavelength by the first wavelength conversion region, and adapted to covert the exciting light beam into a second conversion light beam having a second wavelength by the second wavelength conversion region, and the first wavelength is different from the second wavelength.

9. The wavelength conversion device according to claim 1, wherein the wavelength conversion adhesive layer is adhered on the second region.

10. The wavelength conversion device according to claim 1, wherein the main body has a light transmission region, and the light transmission region is adjacent to the reflective surface.

11. A wavelength conversion device adapted to convert a wavelength of an exciting light beam, the wavelength conversion device comprising:
    a main body having a reflective surface, wherein the reflective surface is located at a transmission path of the exciting light beam;
    a middle adhesive layer adhered on the reflective surface, wherein a material of the middle adhesive layer comprises a first adhesive and a first phosphor powder; and a wavelength conversion adhesive layer adhered on the middle adhesive layer, wherein the exciting light beam is adapted to pass through the wavelength conversion adhesive layer to be reflected by the reflective surface, wherein a material of the wavelength conversion adhesive layer comprises a second adhesive and a second phosphor powder, and a concentration of the first phosphor powder in the middle adhesive layer is lower than a concentration of the second phosphor powder in the wavelength conversion adhesive layer, so that the middle adhesive layer comprising the first adhesive has better adhesive force than the wavelength conversion adhesive layer comprising the second adhesive, wherein a material type of the first phosphor powder of the middle adhesive layer is the same as a material type of the second phosphor powder of the wavelength conversion adhesive layer, and the first phosphor powder of the middle adhesive layer and the second phosphor powder of the wavelength conversion adhesive layer are excited to generate the same conversion light beam.

12. The wavelength conversion device according to claim 11, wherein the exciting light beam is adapted to pass through the wavelength conversion adhesive layer and the middle adhesive layer to be reflected by the reflective surface.

13. The wavelength conversion device according to claim 11, wherein the reflective surface has a first region and a second region, the second region is located at the transmission path of the exciting light beam, the middle adhesive layer is adhered on the first region and exposes the second region, the wavelength conversion adhesive layer is adhered on the middle adhesive layer and covers the second region, the exciting light beam is adapted to pass through the wavelength conversion adhesive layer to be reflected by the second region.

14. The wavelength conversion device according to claim 13, wherein the wavelength conversion adhesive layer is adhered on the second region.

15. The wavelength conversion device according to claim 13, wherein the first region at least partially surrounds the second region.

16. The wavelength conversion device according to claim 11, wherein at least a portion of an edge of the wavelength conversion adhesive layer is adhered on the middle adhesive layer.

17. The wavelength conversion device according to claim 11, wherein the wavelength conversion adhesive layer has a first wavelength conversion region and a second wavelength conversion region, and the main body is adapted to rotate so as to drive the first wavelength conversion region and the second wavelength conversion region to move in sequence to the transmission path of the exciting light beam, the first wavelength conversion region covers a portion of the reflective surface, the second wavelength conversion region covers another portion of the reflective surface, the wavelength conversion adhesive layer is adapted to convert the exciting light beam into a first conversion light beam having a first wavelength by the first wavelength conversion region, and adapted to convert the exciting light beam into a second conversion light beam having a second wavelength by the second wavelength conversion region, and the first wavelength is different from the second wavelength.

18. The wavelength conversion device according to claim 11, wherein the main body has a light transmission region, and the light transmission region is adjacent to the reflective surface.

19. A projector, comprising:
an exciting light source device adapted to provide an exciting light beam;
a wavelength conversion device adapted to convert a wavelength of the exciting light beam, the wavelength conversion device comprising:
a main body having a reflective surface, wherein the reflective surface has a first region and a second region, the second region is located at a transmission path of the exciting light beam and the first region is not located at the transmission path of the exciting light beam;
a middle connection layer disposed on the first region and exposing the second region; and
a wavelength conversion adhesive layer adhered on the middle connection layer, wherein the wavelength conversion adhesive layer covers and adheres without a spatial air gap to the second region, wherein the exciting light beam is adapted to pass through the wavelength conversion adhesive layer to be reflected by the second region, wherein the middle connection layer is disposed between the first region and the wavelength conversion adhesive layer;
a light valve located at the transmission path of the exciting light beam and adapted to convert the exciting light beam into an image light beam; and
a projection lens located at the transmission path of the image light beam and adapted to convert the image light beam into a projection light beam.

20. The projector according to claim 19, wherein the middle connection layer is a modifier, and a chemical reaction is generated between the modifier and the first region of the reflective surface such that the modifier is combined with the first region of the reflective surface.

21. The projector according to claim 19, wherein the middle connection layer is an adhesive layer.

22. A projector, comprising:
an exciting light source device adapted to provide an exciting light beam;
a wavelength conversion device adapted to convert a wavelength of the exciting light beam, the wavelength conversion device comprises:
a main body having a reflective surface, wherein the reflective surface is located at a transmission path of the exciting light beam;
a middle adhesive layer adhered on the reflective surface, wherein a material of the middle adhesive layer comprises a first adhesive and a first phosphor powder; and
a wavelength conversion adhesive layer adhered on the middle adhesive layer, wherein the exciting light beam is adapted to pass through the wavelength conversion adhesive layer to be reflected by the reflective surface,
wherein a material of the wavelength conversion adhesive layer comprises a second adhesive and a second phosphor powder, and a concentration of the first phosphor powder in the middle adhesive layer is lower than a concentration of the second phosphor powder in the wavelength conversion adhesive layer, so that the middle adhesive layer comprising the first adhesive has better adhesive force than the wavelength conversion adhesive layer comprising the second adhesive;
a light valve located at the transmission path of the exciting light beam and adapted to convert the exciting light beam into an image light beam; and a projection lens located at the transmission path of the image light beam and adapted to convert the image light beam into a projection light beam,     wherein a material type of the first phosphor powder of the middle adhesive layer is the same as a material type of the second phosphor powder of the wavelength conversion adhesive layer, and the first phosphor powder of the middle adhesive layer and the second phosphor powder of the wavelength conversion adhesive layer are excited to generate the same conversion light beam.

23. The projector according to claim 22, wherein the exciting light beam is adapted to pass through the wavelength conversion adhesive layer and the middle adhesive layer to be reflected by the reflective surface.

24. The projector according to claim 22, wherein the reflective surface has a first region and a second region, the second region is located at the transmission path of the exciting light beam, the middle adhesive layer is adhered on the first region and exposes the second region, the wavelength conversion adhesive layer is adhered on the middle adhesive layer and covers the second region, the exciting light beam is adapted to pass through the wavelength conversion adhesive layer to be reflected by the second region.

* * * * *